US011919290B2

(12) United States Patent
Beck et al.

(10) Patent No.: US 11,919,290 B2
(45) Date of Patent: Mar. 5, 2024

(54) DEVICE FOR ALIGNING MAGNETIC OR MAGNETIZABLE PARTICLES AND MACHINE FOR GENERATING OPTICALLY VARIABLE IMAGE ELEMENTS

(71) Applicant: KOENIG & BAUER AG, Würzburg (DE)

(72) Inventors: Eugen Beck, Oberthulba (DE); Edwin Kreps, Zellingen (DE); Björn Kriege, Veitshöchheim (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/278,032

(22) PCT Filed: Mar. 31, 2022

(86) PCT No.: PCT/EP2022/058603
§ 371 (c)(1),
(2) Date: Aug. 21, 2023

(87) PCT Pub. No.: WO2022/228822
PCT Pub. Date: Nov. 3, 2022

(65) Prior Publication Data

US 2024/0034052 A1 Feb. 1, 2024

(30) Foreign Application Priority Data

Apr. 28, 2021 (DE) ..................... 10 2021 110 864.0

(51) Int. Cl.
*B41F 27/02* (2006.01)
*B41F 13/10* (2006.01)
(Continued)

(52) U.S. Cl.
CPC .............. *B41F 27/02* (2013.01); *B41F 13/10* (2013.01); *B41F 13/20* (2013.01); *B41F 19/005* (2013.01)

(58) Field of Classification Search
CPC .......... B41F 27/02; B41F 13/10; B41F 13/20; B41F 19/005
See application file for complete search history.

(56) References Cited

U.S. PATENT DOCUMENTS 5,345,864 A * 9/1994 Machguth ............. F16C 13/028 101/216
5,711,223 A 1/1998 Taylor
(Continued)

FOREIGN PATENT DOCUMENTS

CN 103192591 A 7/2013
EP 2114678 B1 7/2011
(Continued)

OTHER PUBLICATIONS

International Search Report of PCT/EP2022/058603 dated Jul. 11, 2022.

*Primary Examiner* — David H Banh
(74) *Attorney, Agent, or Firm* — MATTINGLY & MALUR, PC

(57) ABSTRACT

Magnetic or magnetizable particles contained in a coating agent can be aligned using a device that includes a cylinder having a plurality of magnetic elements around its outer circumference. The magnetic elements are arranged in a matrix having columns extending in the circumferential direction and rows extending in an axially parallel manner. The magnetic elements in some columns are mounted as a group on a shared carrier element, and have a variable axial position collectively as a group and independently of the magnetic elements of an adjoining column. In these columns, at least one of the magnetic elements is arranged on
(Continued)

the carrier element of a multi-piece cylinder body of the cylinder so as to be adjustable in the axial direction, by way of a mechanical adjusting means, and independently of at least one further magnetic element of the same column which is mounted on the same carrier element.

15 Claims, 6 Drawing Sheets

(51) Int. Cl.

| | |
|---|---|
| ***B41F 13/20*** | (2006.01) |
| ***B41F 19/00*** | (2006.01) |

(56) References Cited

U.S. PATENT DOCUMENTS

| | | | | |
|---|---|---|---|---|
| 8,499,687 | B2 * | 8/2013 | Gygy | B41F 13/18 492/8 |
| 10,994,302 | B2 * | 5/2021 | Kriege | B41F 13/08 |
| 2010/0170408 | A1 * | 7/2010 | Gygi | B05D 3/207 101/116 |
| 2011/0168088 | A1 | 7/2011 | Raksha et al. | |
| 2018/0304613 | A1 * | 10/2018 | Gygi | B41F 16/0026 |

FOREIGN PATENT DOCUMENTS

| | | | |
|---|---|---|---|
| EP | 2892723 | B1 | 7/2016 |
| GB | 1261165 | A | 1/1972 |
| WO | 2014/037221 | A1 | 3/2014 |
| WO | 2020/094291 | A1 | 5/2020 |

* cited by examiner

DEVICE FOR ALIGNING MAGNETIC OR MAGNETIZABLE PARTICLES AND MACHINE FOR GENERATING OPTICALLY VARIABLE IMAGE ELEMENTS

CROSS-REFERENCES TO RELATED APPLICATIONS

This application is the US national phase, under 35 USC § 371, of PCT/EP2022/058603, filed on Mar. 31, 2022, published as WO 2022/228822 A1 on Nov. 3, 2022, and claiming priority to DE 10 2021 110 864.0, filed Apr. 28, 2021, and all of which are expressly incorporated by reference herein in their entireties.

TECHNICAL FIELD

Some examples relate to a device for aligning magnetic or magnetizable particles contained in coating agent, comprising a cylinder, which comprises a number of n×m magnetic elements providing magnetic fields in the region of its outer circumference in a matrix-like manner. The magnetic elements are arranged one behind the other in m columns extending in the circumferential direction of the cylinder and next to one another in n rows extending in an axially parallel manner. In several of the columns of magnetic elements arranged one behind the other in the circumferential direction in each case the magnetic elements of these columns being mounted as a group at or on a shared carrier element and being variable with respect to their axial position in or at the cylinder by way of the carrier element, collectively as a group and independently of the magnetic elements of an adjoining column.

Additionally, some examples relate to a machine for generating optically variable image elements on printing substrate sections, comprising a printing substrate infeed, at least one printing unit comprising at least one printing mechanism, by which printing substrate sections guided on a transport path through the machine are printed and/or can be printed at least on a first side with multiple-ups of a number of columns and a number of rows in a matrix-like manner, a product receiving system, by which processed printing substrate sections can be combined into bundles.

BACKGROUND

A printing press comprising a screen printing unit and a device for aligning magnetic or magnetizable particles contained in the printing ink or the varnish is known from EP 2 114 678 B1, wherein the device comprises a cylinder that has, around the circumference, a plurality of a magnetic-field-generating elements arranged in multiple axially adjustable supporting rings.

US 2011/0168088 A1 relates to a device for orienting magnetic flakes, wherein in one embodiment magnets are arranged on the circumference of disks, which are arranged on an axis and can be replaced by disks having a different distribution.

A device for aligning magnetic or magnetizable particles contained in coating agent, comprising a cylinder that, in the region of its outer circumference, comprises magnetic elements arranged in a matrix-like manner, is known from CN 103 192 591 A. Groups, which are arranged one behind the other in the circumferential direction, of magnetic elements that are arranged axially next to one another are in each case arranged on axially extending carrier elements and can be axially moved thereon, so that magnetic elements of a column arranged one behind the other in the circumferential direction can be adjusted in the axial direction, independently of other magnetic elements of the same column. After having been axially positioned, the magnetic elements can be clamped in the carrier elements by screws in the relevant carrier element that act in the circumferential direction. The carrier elements can be positioned in the circumferential direction.

EP 2 892 723 B1 discloses a magnetic cylinder comprising multiple cylinder sections, which on their circumference comprise multiple magnetic elements one behind the other and regions that extend around both sides of the magnetic elements and include suction air openings.

WO 2020/094291 A1 discloses a printing press comprising two magnetic cylinders provided in the substrate path. The magnets there are described as being generally removable and/or rotatable about a radially extending axis and/or arranged on a cylinder main body so as to be adjustable, individually or in groups, with respect to their axial and/or circumferential position, and together therewith form the respective magnetic cylinder. In a specific embodiment, however, the magnets there are arranged one behind the other at ring elements that can be positioned in the axial direction and can preferably be positioned at the ring element in the circumferential direction.

U.S. Pat. No. 5,711,223 A1 relates to a plate cylinder comprising a magnetic device for mounting and demounting printing plates. In one embodiment, magnets are arranged on an inner cylinder, which can be brought by a relative movement between the inner cylinder and an outer cylinder into alignment with magnetic areas at the outer cylinder. In another embodiment, annular magnetic elements are provided in the interior of an outer cylinder, which as a result of axial movement can be brought into alignment with magnetic areas on the outer cylinder which are arranged in an annular manner and are spaced apart from one another.

GB 1 261 165 A relates to the attachment of flexible printing blankets, wherein rings including embedded magnets are provided, which are arranged in spaced relation and have alternating polarities to thereby generate an exterior magnetic field.

SUMMARY

It is an object of some examples herein to provide a device for aligning magnetic or magnetizable particles, as well as a machine for generating optically variable image elements.

This object is achieved according to some examples by the device for aligning magnetic or magnetizable particles contained in a coating agent, as discussed above, in which, in the columns on the cylinder, in each case, at least one of the magnetic elements is arranged and/or mounted on the carrier element of a multi-piece cylinder body of the cylinder so as to be adjustable in the axial direction, by way of mechanical adjusting means comprising a gearbox, independently of at least one further magnetic element of the same column which is mounted on the same carrier element. This object is further achieved by a machine for generating optically variable image elements on printing substrate sections that includes such a cylinder.

The advantages that can be achieved with the invention are in particular that the alignment device enables improved accuracy during the treatment of optically variable image elements and/or a broader application or process spectrum for providing optically variable image elements and/or a more rapid changeover to narrower multiple-up copies.

Using the device according to the invention, it is possible to correct or, if necessary, also deliberately vary, both format-induced changes in distances between columns of magnetic elements and random or systematic register deviations of individual magnetic elements with respect to the printing substrate path and/or with respect to other magnetic elements related to the same column of multiple-ups. For example, manufacturing and/or assembly tolerances for the magnetic elements are conceivable for the case of random deviations. Systematic errors can in particular be induced by prior process steps, which manifest as minor deformations of the printing substrate, for example. Printing substrate sheets, for example, may trapezoidally widen to a minor degree toward the trailing end due to high mechanical loading during a preceding process, for example when passing through an intaglio printing unit. Such a process can have taken place inline or by a separate machine. For the case of web-format printing substrate, a minor constriction is a conceivable cause of a systematic deviation from a constant multiple-up or printing substrate width on the printing substrate, which may arise due to web tension between a clamping point arranged upstream from the alignment means and a clamping point arranged downstream from the alignment device. Format-induced changes are required, for example, during a modification carried out to print narrower multiple-ups.

After printing ink containing magnetic or magnetizable particles has been applied, the particles are present in the ink matrix in a substantially unorganized manner. By subsequently aligning one or more partial regions for producing an image motif or pattern within the previously printed surface area, hereafter also referred to as image-producing alignment, a portion of the particles is deliberately aligned in such a way that the desired optical effect is created when the print image is viewed. Especially in the case of fine and/or multi-color structures that are to be represented by the optical effect, exact positioning and a correct progression of the magnetic field lines relative to the area on the substrate to be aligned are indispensable for a high-quality depiction.

A device for aligning magnetic or magnetizable particles contained in coating agent which is to be particularly preferred comprises a cylinder, which comprises a number of $n \times m$ (in words: n times m, where n, m 0 ]) magnetic elements in the region of its outer circumference in a matrix-like manner, which are arranged one behind the other in m columns extending in the circumferential direction of the cylinder and next to one another in m rows extending next to one another in the axial direction, wherein, in multiple of the columns of magnetic elements arranged one behind the other in the circumferential direction, in each case one of the magnetic elements is arranged and/or mounted on a one-piece or multi-piece cylinder body of the cylinder so as to be adjustable in the axial direction, independently of at least one further magnetic element of the same column, wherein the magnetic elements of at least these columns are mounted in each case as a group at or on a shared carrier element and can be varied with respect to their axial position in or at the cylinder by way of the carrier element, collectively as a group and independently of the magnetic elements of an adjoining column.

In other words, a likewise particularly advantageous embodiment of the device for aligning magnetic or magnetizable particles contained in coating agent on a substrate comprises, for example, a cylinder, which, in the region of its outer circumference, as viewed in the axial direction, comprises next to one another a number m of groups, each comprising a number n of magnetic elements arranged one behind the other in the circumferential direction, wherein the magnetic elements of a group are mounted on a shared carrier element and can be varied with respect to their axial position in or at the cylinder by way of the same, collectively and independently of magnetic elements of an adjoining group, and wherein at least one of the magnetic elements mounted on the carrier element is arranged and/or mounted at the carrier element so as to be adjustable in the axial direction, independently of at least one further magnetic element mounted on the same carrier element.

Preferably, multiple or even all magnetic elements of multiple or even all groups are mounted, or mounted in such an axially adjustable manner.

In particular a machine, for example a securities printing press, for generating optically variable image elements on printing substrate sections, comprising a printing substrate infeed, in particular configured as a sheet feeder, comprising at least one printing unit comprising at least one printing mechanism, in particular a screen printing mechanism, by which printing substrate sections guided on a transport path through the machine are printed and/or can be printed at least on a first side in a matrix-like manner with multiple-ups of a number of columns and a number of rows, and comprising a product receiving system, by which processed printing substrate sections can be combined into bundles, in particular configured as a pile delivery, preferably comprises an above-described device for aligning magnetic or magnetizable particles in the transport path of the printing substrate sections between the printing unit and the product receiving system.

Further details and variant embodiments may be derived from the following exemplary embodiments.

BRIEF DESCRIPTION OF THE DRAWINGS

Exemplary embodiments of the invention are illustrated in the drawings and will be described in greater detail below. The drawings show.

DETAILED DESCRIPTION

Figure 1:
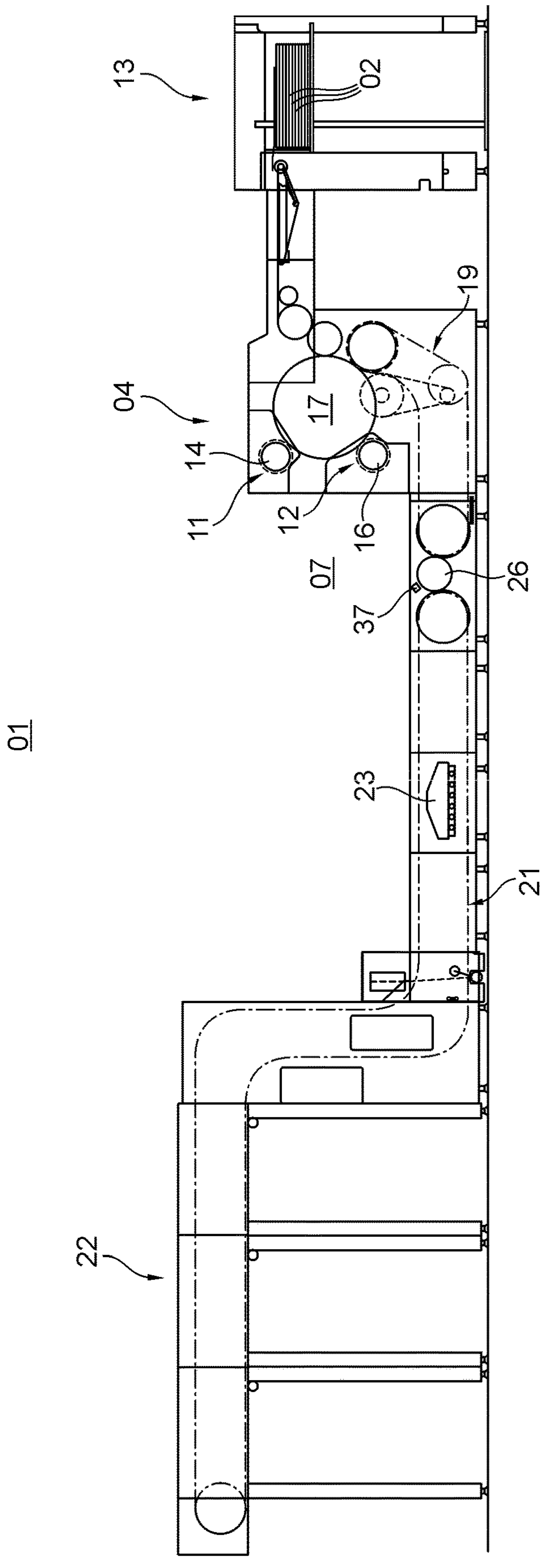
FIG. 1 an exemplary embodiment of a machine for generating optically variable image elements on a substrate.
Figure 2:
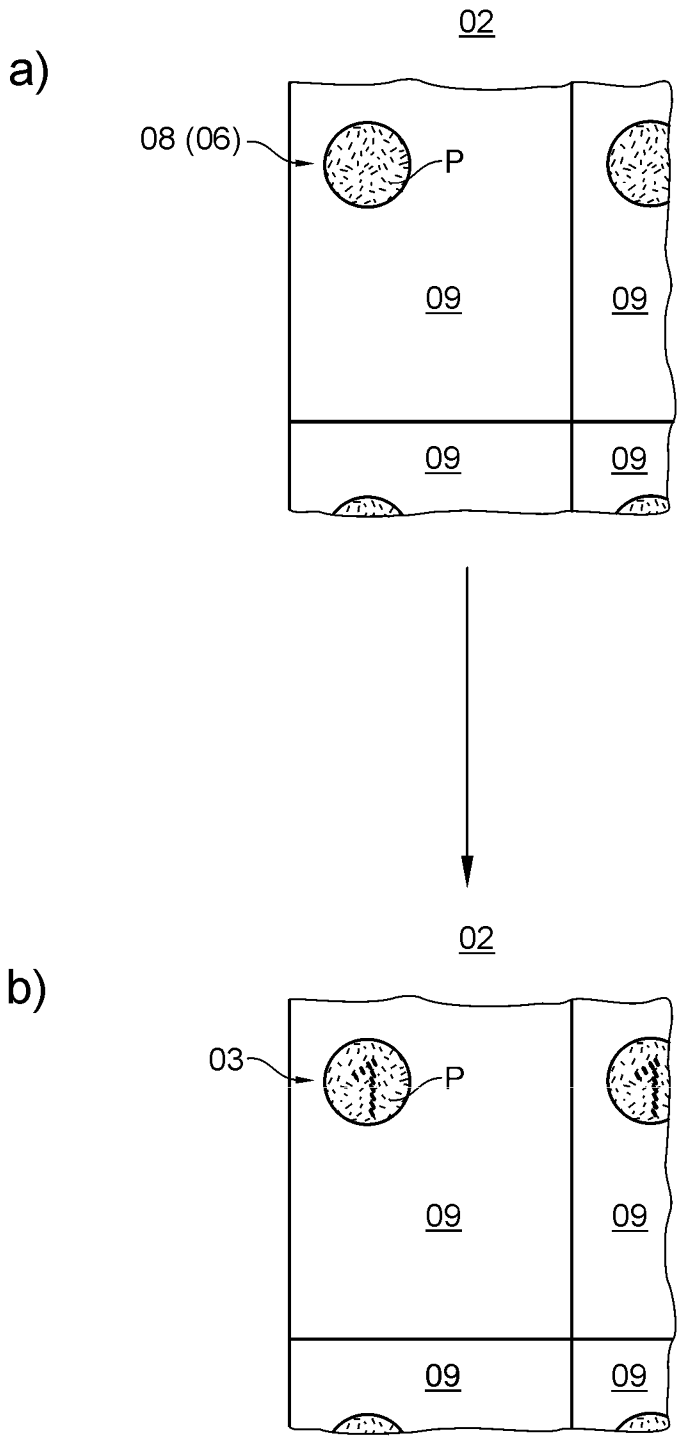
FIG. 2 a schematic illustration of a substrate printed in print elements with an optically variable coating agent, wherein a) shows a state with magnetic or magnetizable particles not yet oriented, and b) shows a state after an image-producing part has been aligned, here by way of example in the form of a digit "1;"

A machine 01, for example a printing press 01, in particular a securities printing press 01, for generating optically variable image elements 03 on a substrate 02, for example a web-format or sheet-format printing substrate 02, comprises an application device 04, for example a printing unit 04, by which optically variable coating agent 06, for example optically variable printing ink 06 or varnish 06, at at least one application point, for example printing nip, can be applied to at least one first side of the substrate 02, for example of the printing substrate 02, across the entire surface area or in partial regions in the form of print image elements 08, and a device 07 for aligning particles P that are contained in the optically variable coating agent 06 applied to the substrate 02 and that are responsible for the optical variability (see, for example, FIG. 1). This device 07 is also referred to as an alignment device 07 for short or, since it produces an image of the optically variable pattern or motif as a result of a defined alignment of the particles P, is also referred to as an image-producing alignment device 07. An application of coating agent 06 that contains particles P onto the printing substrate 02 and an image element 03 obtained by a subsequent image-producing alignment of previously randomly oriented particles P are schematically shown, for example, in FIG. 2 based on an illustration of the digit "1." Here, a) represents a state in which the coating agent 06 has been applied and, for example, is still present in randomly oriented form, and b) represents a state in which an image-producing alignment has taken place.

The print image elements 08 made up of variable coating agent 06 which are applied onto the substrate 02 by the application device 04 prior to the treatment by the alignment device 07 can correspond to the optically variable image elements 03 to be generated in terms of size and position, or possibly may also be larger than these, and possibly can even extend across the surface area of several multiple-ups 09. In the case of larger print image elements 08, for example, an optically variable image element 03 is not generated by alignment on the entire surface area that is coated with optically variable coating agent 06.

The particles P responsible for the optical variability contained here in the coating agent 06, for example the printing ink 06 or the varnish 06, are magnetic or magnetizable, non-spherical particles P, for example pigment particles P, hereafter also referred to as magnetic flakes for short.

Figure 3:
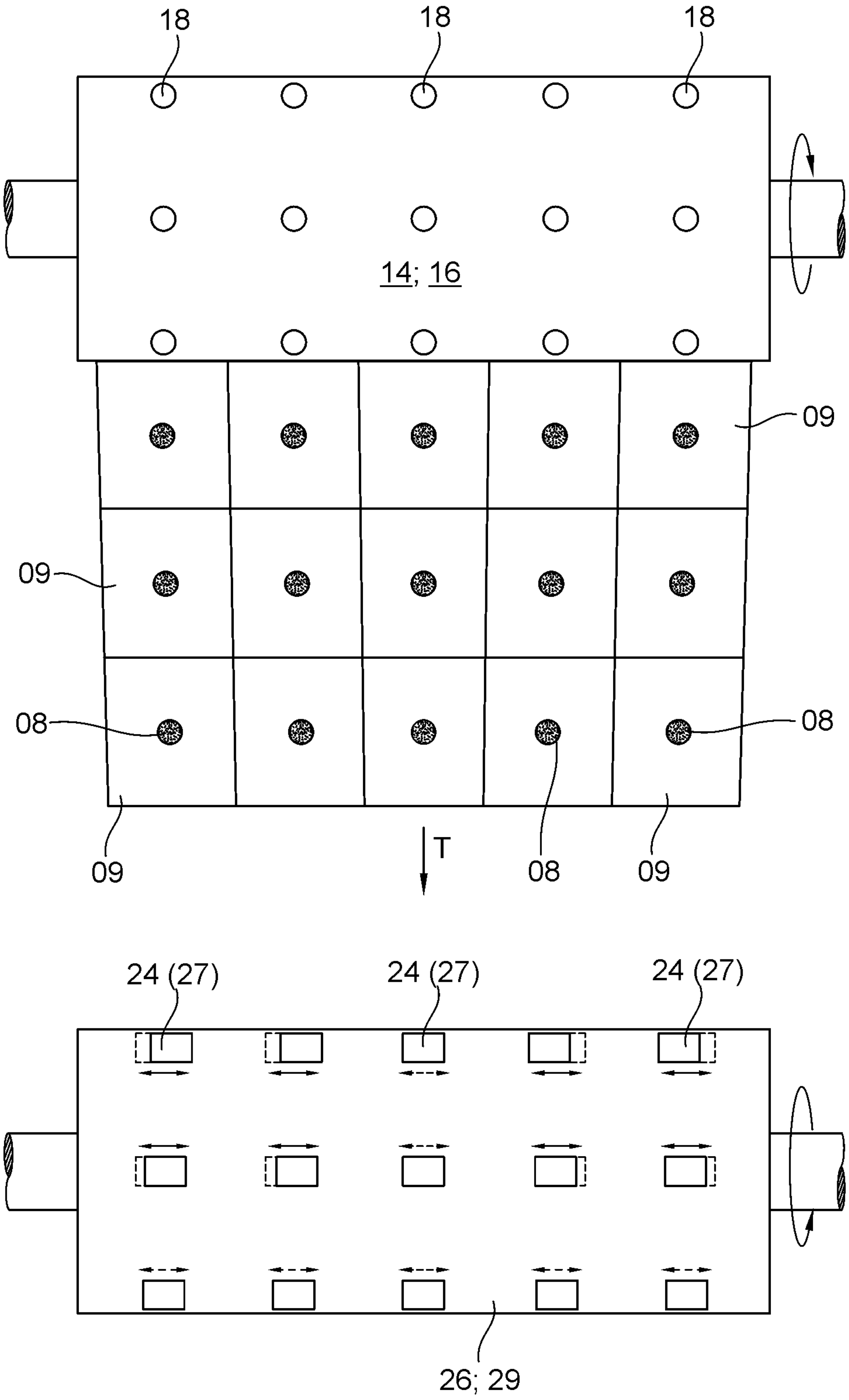
FIG. 3 a schematic illustration of a printing process and downstream alignment process with an image-producing printing mechanism cylinder and a cylinder comprising magnetic elements, shown by way of example with a substrate sheet trapezoidally widening toward the trailing end.

The machine 01 is preferably configured to produce multiple-ups 09, for example securities 09, and in particular bank notes 09. This shall in particular also cover the production of intermediate securities products, for example the production of printing substrate 02, in particular in the form of web-format or sheet-format printing substrate sections 02, in particular printing substrate sheets 02, using print images of multiple securities 09. The substrate 02 can be formed by, for example cellulose-based or preferably cotton fiber-based, or at least cellulose-containing or preferably cotton fiber-containing, paper, by plastic polymer or by a hybrid product thereof. It may be present uncoated prior to being coated in the above-described application device 04, or may already have been coated, or it may be unprinted or already have been printed once or multiple times in one or more upstream processes, or may have been mechanically processed in another manner. Preferably, several multiple-ups 09, for example bank notes 09 to be produced or their print images, are arranged on a printing substrate section 02 that is formed by a longitudinal section of web-format substrates 02 or formed by a sheet of a sheet-format substrate 02 in a matrix-like manner, next to one another in rows extending transversely to the transport direction T and one behind the other in columns extending in the transport direction T, or are to be arranged during the course of the processing operation of the substrate 02 (indicated, for example, in FIG. 2 and in FIG. 3).

The machine 01 configured as a printing press 01 can generally comprise one or more printing units 04 including one or more printing mechanisms 11; 12 of arbitrary printing methods. In a preferred embodiment, however, it comprises a printing unit 04 comprising at least one printing mechanism 11; 12 operating according to the flexographic printing method, or preferably according to the screen printing method, by which the optically variable coating agent 06 is or can be applied onto a first side of the printing substrate 02. A greater film thickness, compared to other printing methods, can be applied, for example, by the described printing methods, in particular the screen printing method. The expression of the "first side" of the substrate 02 or printing substrate 02 is selected arbitrarily and is intended here to denote the side of the printing substrate 02 onto which optically variable coating agent 06 to be treated is or was or can be applied downstream by the alignment device 07.

In the illustrated and preferred embodiment, the printing press 01 comprises a printing substrate infeed 13, for example a roll unwinder 13, or preferably a sheet feeder 13, from which the, for example, web-format or preferably sheet-format, printing substrate 02 is or can be fed, possibly via further printing or processing units, to the printing unit 04, for example flexographic or preferably screen printing unit 04, which applies the optically variable coating agent 06 and comprises at least one printing mechanism 11; 12, for example flexographic or preferably screen printing, mechanism 11; 12. In the illustrated and advantageous embodiment, two screen printing mechanisms 11; 12 are provided, which are preferably combined in the same printing unit 04 and, between a respective forme cylinder 14; 16, for example in a screen printing cylinder 14; 16, and a shared impression cylinder 17, form two printing nips for the same, here the first, side of the printing substrate 02 (see, for example, FIG. 1).

Preferably, the printing mechanism 11; 12 comprises a forme cylinder 14; 16 as the image-producing cylinder, including a multiplicity of, in particular like and/or identical, image-producing print elements 18, hereafter also referred to as print motifs 18 or, in particular like and/or identical, groups of image-producing print elements 18 or print motifs 18 around the circumference, which, on a circumferential length corresponding to the print image length, are arranged in multiple, for example a number, for example, of four to eight, in particular five to seven, for example six, columns that are spaced apart from one another transversely to the transport direction T and, on a cylinder width corresponding to the print image width, in multiple rows that are spaced apart from one another in the transport direction T. In the case of a printing mechanism 11; 12 operating according to the flexographic printing method, these print motifs 18 are designed in the manner of letterpress print reliefs, and in the preferred case of a printing mechanism 11; 12 operating according to the screen printing method, they are designed in the manner of screen printing stencils.

The respective column of image-producing print motifs 18 extending in the circumferential direction of the forme cylinder 14; 16 relates to the same column of multiple-ups 09 provided, or to be provided, one behind the other on the substrate 02. Ideally, these multiple-ups 09 are aligned with one another along the transport direction T and have a uniform width. In cases deviating therefrom, for example when, during an upstream process or due to other mechanical or physical loading, a trapezoidal deformation of the substrate 02 printed previously in the pattern of the multiple-ups 09 has taken place, a geometry that has been changed in this way can be countered by an accordingly varied arrangement of the print motifs 18 on the forme cylinder 14; 16. The print motifs 18 of individual columns are then, for example, not strictly aligned with one another in the circumferential direction, but are located, for example, partially on helical lines that are slightly inclined in relation to the circumferential line (shown, for example, in an exaggerated illustration in FIG. 3 for better perception). The width of the multiple-ups 09 on the substrate 02 increases, for example, from the leading to the trailing end of the substrate section or substrate sheet 02 or, for example with appropriate infeed at the entrance of the printing press 01, possibly in the opposite direction.

From the printing unit 04 applying the optically variable coating agent 06, the printing substrate 02 can be fed via conveying means of a first conveyor device 19 to the alignment device 07. In the case of web-format printing substrate 02, this can be one or more positively driven and/or non-driven rollers, via which the printing substrate 02 can be guided or is guided on the input side into the alignment device 07. For the preferred case of sheet-format printing substrate 02, i.e., individual printing substrate sheets 02 passing through the printing unit 04, sheet-conveying means, such as one or more transfer cylinders or drums, or, as shown, a conveying device 19 configured, for example, as a revolving gripper conveyor 19, for example as a so-called chain gripper system 19, are provided as conveying means.

After having passed through the alignment device 07, which is described in greater detail below, the printing substrate 02 can be guided via conveying means of a further, for example second, conveyor device 21 to a product receiving system 22 for receiving the printing substrate 02 that has been processed and/or worked in the machine 01, for example a winder 22 in the case of web-format printing substrate 02 or a pile delivery 22 in the preferred case of sheet-format printing substrate 02. For the case of web-format printing substrate 02, this can again be one or more positively driven or non-driven rollers, which continue the transport path of the first conveyor device 19 through the alignment device 07 and via which the printing substrate 02 can be guided or is guided on the input side into the winder 22. For the preferred case of sheet-format printing substrate 02, sheet-conveying means, for example one or more transfer cylinders or drums, or, as shown, a conveying device 21 configured, for example, as a revolving gripper conveyor 21, in particular a so-called chain gripper system 21, are provided as conveying means which receive the printing substrate sheets 02 from the transport path section of the alignment device 07 and, for example, feed these to the pile delivery 22.

At least one drying device comprising one or more dryers 23, for example radiation dryers 23, directed at the first side of the printing substrate 02, and possibly a cooling unit (not shown), for example a cooling roller, can be provided at the transport path leading away from the alignment device 07. In a refinement that is not shown, an inspection device (not shown), for example an area scan camera or a line camera, can be provided on the transport path between the alignment device 07 and the pile delivery 22.

Even though the alignment device 07 described hereafter in detail is essentially arbitrary in terms of its designs, variant embodiments, or configurations, it is preferably provided or can be provided in an above-described machine 01 or printing press 01. In an advantageous embodiment, it is designed in the manner of a module and can be inserted into the transport path of the machine 01 to be fitted therewith using input-side and output-side interfaces to the open section ends of a conveyor system, which continues upstream and downstream.

The alignment device 07 for creating optically variable image elements 03, for example for creating the optically variable effect in the optically variable coating agent 06 applied previously, for example in the form of print image elements 08, onto the substrate 02, in particular onto the printing substrate 02, has a defined transport path along which the substrate 02 to be conveyed through the alignment device 07 is fed or can be fed from an entrance area, in which the substrate 02 to be treated and comprising, on its first side, an optically variable coating agent 06, is brought or can be brought into operative connection in a defined manner with an alignment device 26 that comprises elements 24 providing magnetic fields, magnetic elements 24 for short, preferably in such a way that the magnetic elements 24 of the alignment device 26, which serve image-producing orientation purposes, and the printing substrate 02 printed with the printing ink 06 containing the particles P move synchronously with respect to one another, at least on a section of the transport path. The alignment device 26 is preferably designed as a magnetically active cylinder 26, magnetic cylinder 26 for short, which around the circumference comprises the arrangement of magnetic elements 24 and via which the printing substrate 02 is guided or conveyed, starting from an entrance area, in the direction of an exit area of the alignment device 07.

The magnetic elements 24 can be formed directly by magnets themselves, or can preferably comprise one or more magnets 27, which are arranged, preferably detachably, in or at a mount 28. Here, in general, magnets 27 shall be understood to mean magnetically active devices that, permanently or switchably, at least toward the side of the transport path, induce a magnetic field, which is sufficiently strong, in particular for aligning particles P contained in the coating agent 06 on the substrate 02 being guided over the same, as described here. The magnets 27 can be formed by one or more permanent magnets with or without engraving, by solenoids, or by combinations of one or more permanent magnets and/or one or more solenoids. Regardless of whether a single magnet or a combination of multiple magnets, for example permanent magnets and/or solenoids, is involved, the term ‘magnet’ 27 hereafter shall also be understood to mean multiple magnets 24 that are assigned to the same magnetic element 27 and, in their entirety, form an action unit, unless explicitly expressed otherwise.

Generally, it is also possible for two such alignment devices 26, in particular cylinders 26, to be provided in the transport path, which are arranged on the same side, or on different sides, of a substrate 02 to be conveyed along the transport path.

In an advantageous embodiment, a drying and/or curing device 37, for example a radiation dryer 37, in particular a UV radiation dryer 37, UV dryer 37 for short, is assigned to the alignment device 07, which is preferably configured as a UV LED dryer 37 and/or is directed at a location in the transport path at which the substrate 02 cooperates with the alignment device.

The alignment device 26, in particular the magnetic cylinder 26, is arranged in the transport path of the substrate 02 to be conveyed, preferably on its second side, so as to point outwardly with its first side, which is coated in particular upstream inline with optically variable coating agent 06, while passing the alignment device 26, in particular being transported over the magnetic cylinder 26.

The alignment device 26 comprises a one-piece, or preferably a multi-piece, magnetic element carrier 29 at or on which the magnetic elements 24 are, preferably detachably, arranged. For the preferred case of a cylinder 26 that is rotatably mounted in a frame, the magnetic element carrier 29 is, for example, formed by a one-piece, or preferably multi-piece, cylinder body 29. The term of the cylinder body 29 shall encompass both closed structures, i.e., having a substantially closed outer cylinder surface, and open structures, i.e., scaffolding-like or frame-like structures, such as the example illustrated with regard to FIG. 4.

The alignment device 26, which is preferably configured as a magnetic cylinder 26, comprises the plurality of magnetic elements 24 in the region of the side facing the substrate path, for example, in the region of the outer circumference, in particular in the region of an outer cylindrical shell surface of the cylinder body 29, which are used to orient at least a portion of the magnetic or magnetizable particles P of the coating agent 06 applied to the passing printing substrate 02.

In particular for the case of a plurality of multiple-ups 09 per substrate section, for example, per printing substrate sheet or substrate sheet 02, which is preferred and described here, multiple columns or groups, in particular a number m (m 0 ]>1) of columns or groups corresponding to the number of columns on the printing substrate section 02, which each include multiple magnetic elements 24, in particular a number n (n 0 ]>1) of magnetic elements arranged one behind the other, as viewed in the transport direction T of the substrate 02 and/or in the circumferential direction of the cylinder 26, which corresponds to a number of rows of multiple-ups 09 on the printing substrate section 02 to be treated, are provided, or a number of n×m (in words: n times m, where n, m 0 ]) magnetic elements 24 are arranged in a matrix-like manner, at the magnetic element carrier 29, for example at the cylinder body 29, as viewed in the axial direction, preferably in such a way that, per column or group, the same number n of magnetic elements 24 is provided around the circumference and arranged in axially parallel extending rows and/or in particular in such a way that these, when rolled out on the substrate 02, correspond to the pattern of image elements 03 to which magnetic fields are to be applied on the substrate 02, assuming a correct register between the substrate position in the transport direction T and the cylinder angle position. The magnetic elements 24 of the groups arranged one behind the other are in particular arranged one behind the other in the circumferential direction so as to at least partially overlap, when rolled out, along a circumferential line and/or end up in multiple-ups 09 of the same column of a substrate 02 to be treated.

By guiding the substrate 02 over a magnetic cylinder 26 configured in this way, wherein, for example, the first substrate side points to the outside when transported over the first cylinder 26, it is possible to cause particles P to be aligned or oriented in the region of the image elements 03 provided on the multiple-ups 09 by means of the magnetic elements 24, i.e., here, for example, through the substrate 02, for example.

The number m of the groups is, for example, four to eight, in particular five to seven, for example six, and/or the number n of the magnetic elements 24 of a group is, for example, two to twelve, advantageously five to ten. The alignment device 26 or the magnetic element carrier 29 is preferably configured in such a way that the number m of groups and/or the number n of magnetic elements 24 arranged one behind the other in a group can be varied, for example within the above-described boundaries, so as to adapt these to different requirements.

To be able to correct, and possibly also deliberately vary, random or systematic register deviations of individual magnetic elements 24 with respect to the printing substrate path, i.e., with respect to the lateral position of the conveyed printing substrate 02 and/or with respect to other magnetic elements 24 related to the same column of multiple-ups 09 situated one behind the other in the transport direction T, in each case at least one of the magnetic elements 24, in multiple groups of magnetic elements 24 extending in the circumferential direction, can be adjusted or moved in the axial direction, independently of at least one further magnetic element 24 of the same group, and in particular can be mounted so as to be adjustable at the magnetic element carrier 29, in particular at the cylinder body 29 of the magnetic cylinder 26. Preferably, multiple, advantageously all except one (i.e., at least n−1), in particular advantageously, however, all (i.e., n), magnetic elements 24 of the same group are mounted so as to be axially movable, independently of other magnetic elements 24 of the group, and/or multiple, advantageously all except one (n−1), or all, magnetic elements 24 of at least the two groups of at least three groups that are closest to the end face are mounted so as to be axially movable in or at the magnetic element carrier 29, in particular cylinder body 29, independently of other magnetic elements 24 of the group.

For an above-described matrix-like arrangement, the magnetic elements 24 can be arranged and mounted at or in a magnetic element carrier 29, in particular cylinder body 29, in such a way that at least the groups of magnetic elements 24 that are the same relative to other magnetic elements 24 are mounted at or in the magnetic element carrier 29 or cylinder body 29 so as to be variable in their axial position relative to the one-piece or multi-piece magnetic element carrier or cylinder body.

Preferably, the magnetic elements 24 are arranged or can be arranged detachably at the cylinder 26, preferably in a corresponding mount 28, in such a way that they, in the mounted state, can be arranged at a defined location around the circumference of the cylinder 26 and can preferably be completely removed from the cylinder 26 and/or can be positioned around the circumference of the cylinder 26 in the axial and/or circumferential directions.

In addition to the above-described independent axial positionability of individual or all magnetic elements 24 of the group, the magnetic elements 24 of a group can also be varied as a whole and independently of an adjoining group with respect to their axial position in the alignment device 26 or in the cylinder 26. In particular, in this way multiple, advantageously at least the two groups of at least three groups that are closest to the end face, advantageously all groups, are mounted so as to be axially movable in or at the magnetic element carrier 29, in particular cylinder body 29.

Figure 4:
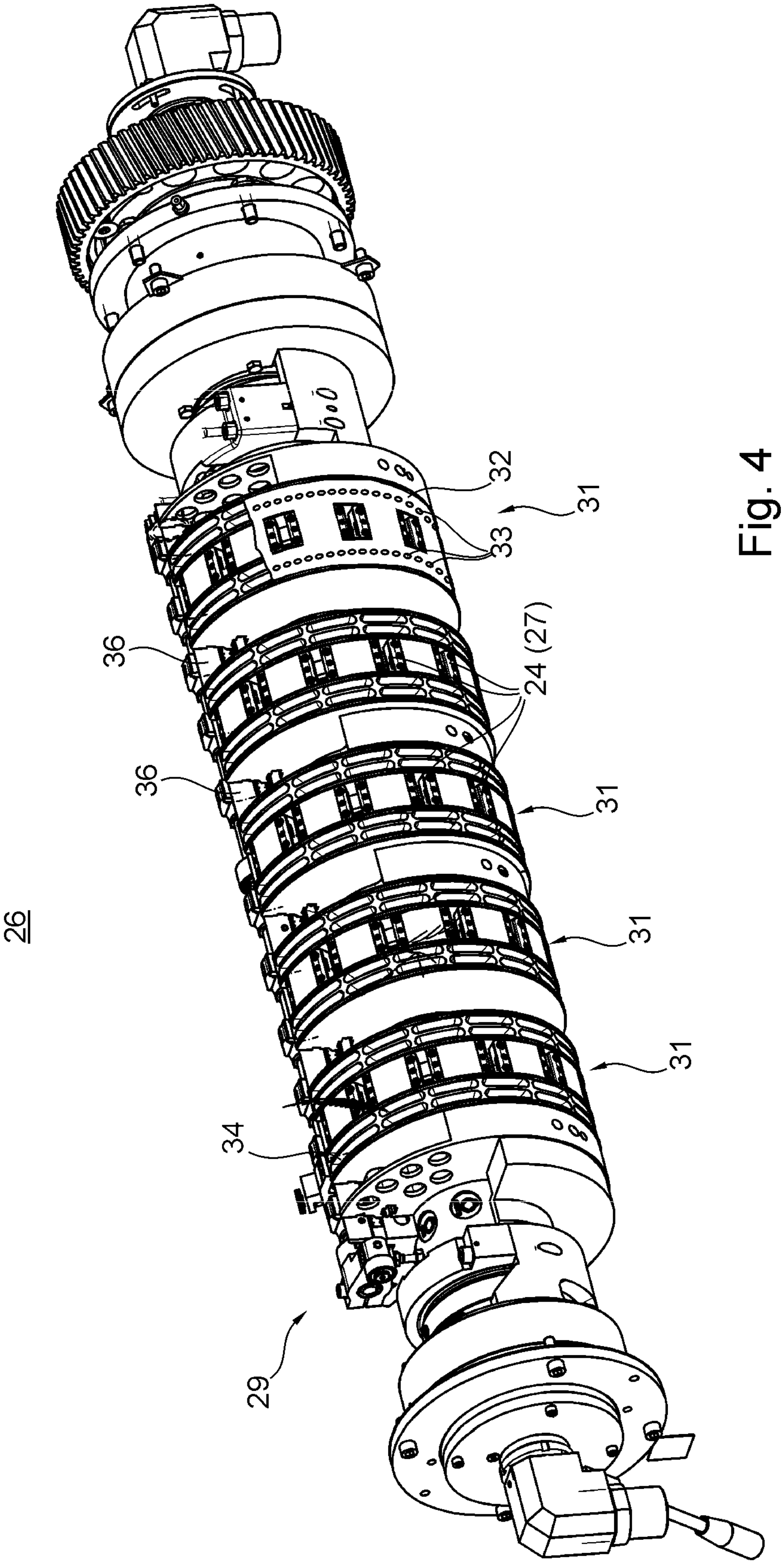
FIG. 4 an oblique view of an embodiment for a cylinder comprising magnetic elements.
Figure 5:
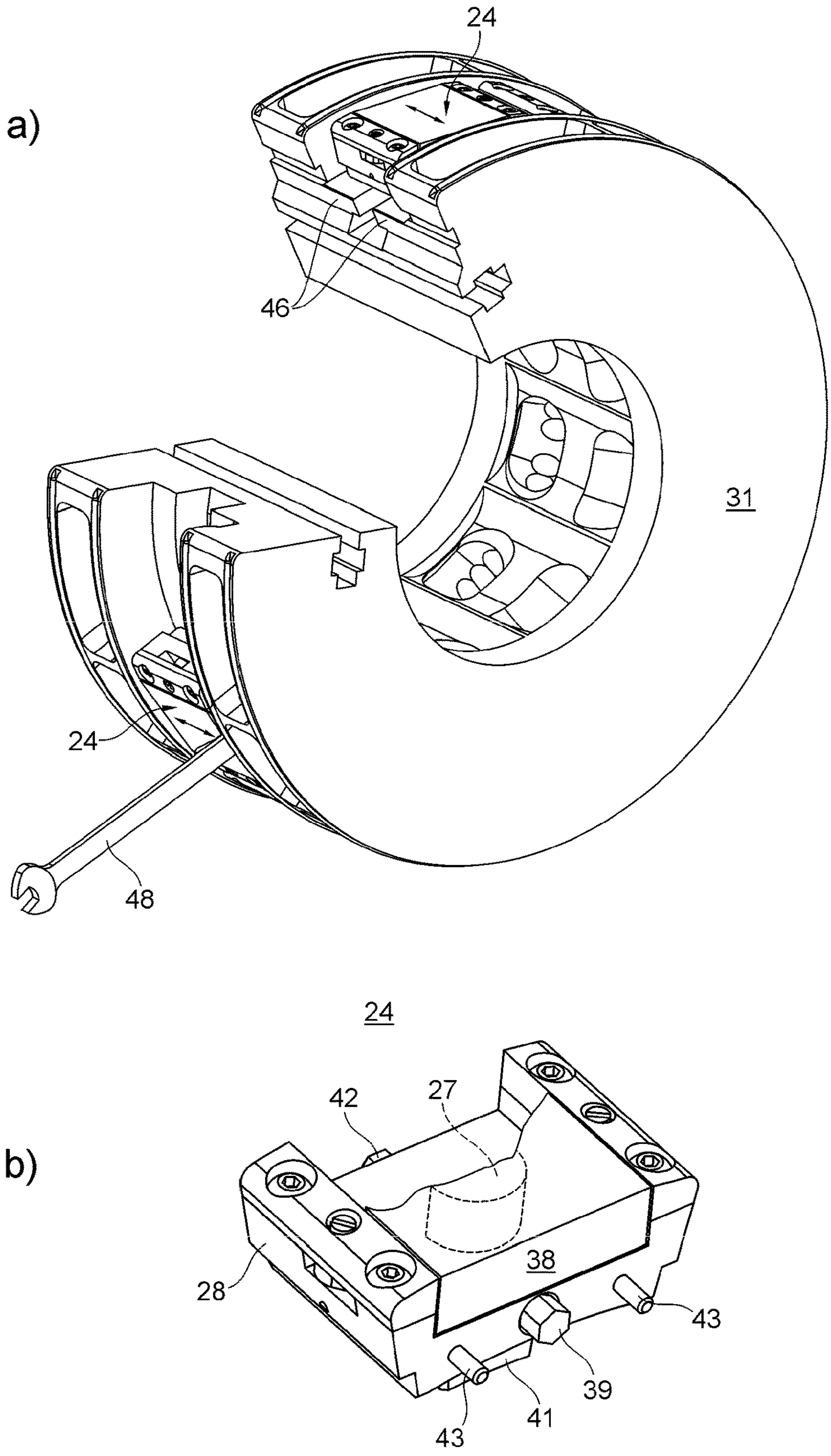
FIG. 5 an individual representation a) of a carrier element according to FIG. 4 fitted or fittable with multiple magnetic elements one behind the other in the circumferential direction, and b) a magnetic element from a) shown in an enlarged view.
Figure 6:
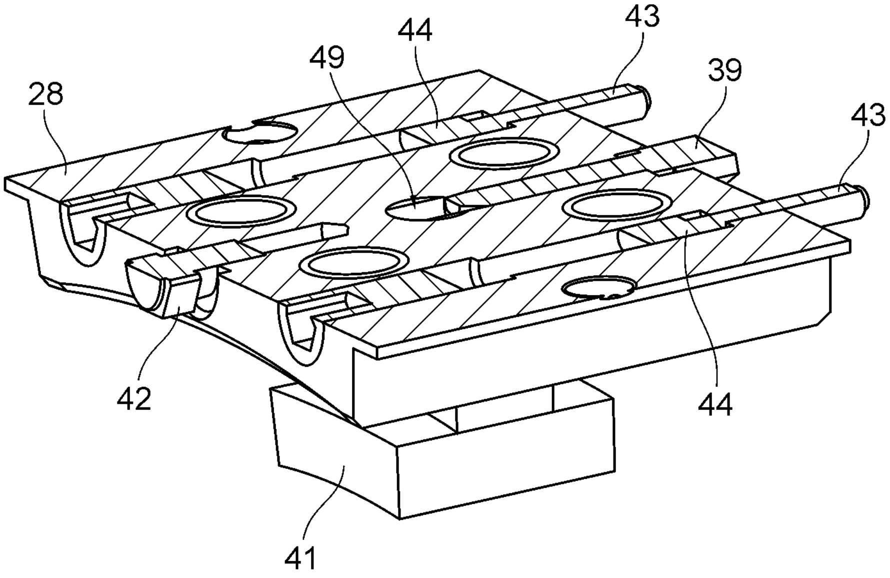
FIG. 6 a sectional view through a base of the magnetic element from FIG. 5, as viewed in the radial direction of the magnetic cylinder, at the height of the fastening and adjusting means.
Figure 7:
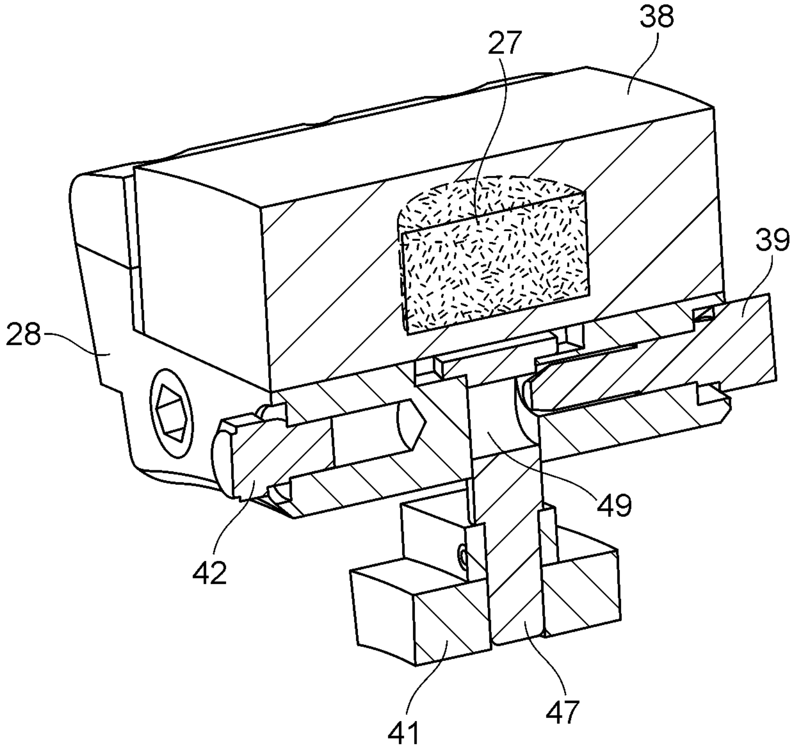
FIG. 7 a sectional view through a magnetic element, as viewed in the circumferential direction of the magnetic cylinder, at the height of the clamping drive and the adjusting means.

For this purpose, the magnetic elements 24 are arranged or can be arranged in or at multiple, for example a number m of four to eight, in particular five to seven, for example six, carrier elements 31, for example here ring elements 31, which are axially spaced apart from one another and an above-described portion of which, or preferably all of which, can be positioned in the axial direction on an axis or shaft, wherein in or at these ring elements 31, in turn, in each case multiple, for example two to twelve, advantageously five to ten, magnetic elements 24 are arranged or can be arranged one behind the other in the circumferential direction and at least some of which, or all of which, are arranged or can be arranged so as to be positionable in the circumferential direction (see, for example, FIG. 4). In the region of their outer circumference, the ring elements 31 are closed, for example, by peripheral coverings 32, for example covers 32 connected in one piece to the ring ribs or cover plates 32 placed thereon, in which, for example, suction openings 33 as well as cut-outs, which are not denoted in detail, are provided at the respective location of the magnetic elements 24 (indicated, by way of example, for a portion of the right ring element 31 in FIG. 4). As an alternative, a cover plate 32 that extends axially across all ring elements 31 can be provided, which has cut-outs and/or suction openings 33 at the relevant locations. The suction openings 33, in particular suction channels 34 therebeneath, have a line connection to a vacuum pump, for example via an end-face rotary feed-through.

For the case of web-format substrates 02, the magnetic cylinder 26 can be designed without any holding means acting on the substrate 02 and, for example, with ring elements 31 that are closed in the circumferential direction. If necessary, the above-described suction air openings 33 can be provided around the circumference, which are connected to a vacuum pump and ensure that the substrate 02 rests securely on the outer cylindrical surface. For the case of sheet-format substrate 02 preferred here, holding means 36, for example grippers 36 of a so-called gripper bar, are provided around the circumference of the cylinder 26, by which a substrate sheet 02 to be conveyed via the cylinder 26 can be received at its leading end, and can be held or is held during a rotation of the cylinder 26 over an angular region. A magnetic cylinder 26 configured in this way at the same time serves to transport the substrate 02. The ring elements 31 are, for example as shown, interrupted in the circumferential direction to receive the holding means 36.

In an advantageous embodiment, the at least one magnet 27 or a magnetic system is arranged on or in an above-described mount 28. It may be accommodated in a housing 38, which is arranged in or at the mount 28, for example, so as to be detachable from the mount 28.

In contrast to, for example, purely manual and/or tool-less moving, the magnetic element 24 or the mount 28 encompassed thereby is preferably moved or adjusted in the axial direction by way of, in particular mechanical, adjusting means 42, 43, 44, which in particular comprise a gearbox, including, for example, a gearbox, preferably a screw drive, i.e., by way of a rotative relative movement between an internal thread and an external thread, which converts, for example directly or indirectly, an, in particular input-side, rotational movement into a linear movement, in particular of the magnetic element 24 or of the mount 28 carrying the magnetic elements 24. The rotative relative movement is preferably carried out about an axis or the thread axis extends along an axis extending parallel to the axis of rotation of the cylinder 26.

In an embodiment that is not shown, a threaded shaft, which extends with its longitudinal axis axially parallel to the cylinder 26 and is mounted at the cylinder body 29 so as to be rotatable, but fixed in the axial direction, and which has an external thread, can engage in a threaded sleeve of the mount 28 having an internal thread, and move the same by rotating the screw thread in the axial direction. The threaded shaft can be configured as part of a screw, whose end or center piece is formed by a screw head that can be actuated by a tool.

In another embodiment, a stop means limiting the axial movement of the magnetic element 24 toward one side can be provided, whose stop surface limiting the axial position can be varied by way of a screw drive, wherein the magnetic element 24 is preferably preloaded by a force, for example a spring or pneumatic force in the direction of the bearing surface of the stop means by way of a means 44 that applies a force to the magnetic element 24. In one embodiment, such a stop means can, for example, be provided by an end, for example a screw head, of a threaded shaft having an external thread, which rotatably engages in a threaded sleeve provided at the magnetic element carrier 29 or cylinder 26, wherein the position of the stop, and thus of the magnetic element 24, is provided by rotating the threaded pin, for example a screw, in the one or the other direction. In another embodiment, which is shown here, the stop means is formed by one end of a threaded shaft 42 or of an attachment thereon continuing the same, for example as a shank and head of an adjusting screw 42, which rotatably engages in a threaded sleeve provided at the magnetic element 24 or at the mount 28, and which is supported in the axial direction against a portion of the cylinder body 29 which is fixed to the cylinder. The magnetic element 24 or the mount 28 is preferably spring-preloaded in the axial direction toward the bearing surface of the stop. For this purpose, for example, at least one stop 43, for example a ram 43, which is preloaded by a resilient means 44, for example a compression spring 44, serving as a force-applying means 43, is provided on the side of the magnetic element 24, or of the mount 28 encompassed thereby, located opposite the adjusting screw 42, the stop being supported with an end protruding from the mount 28 against a portion of the cylinder body 29 which is fixed to the cylinder. Preferably, two such rams 43 are provided. By rotating the adjusting screw 42 provided on the one side of the magnetic element 24 or mount 28 in the one direction, the magnetic element 24 or the mount 28 is further displaced against the spring force to the side of the ram or rams 43, while the magnetic element 24 or the mount 28 is further displaced to the side of the adjusting screw 42 by rotation in the other direction.

An adjustment range in the axial direction, as viewed from a center position, is, for example, at least ±1.0 mm (i.e., a total adjustment travel of at least 2 mm), preferably at least ±1.2 mm, for example ±1.5 mm.

Axial adjustment of the relevant magnetic element 24 can be carried out in a more convenient embodiment by a respective remotely actuated drive means, for example an electric motor driving the screw drive. In a less complex embodiment shown here, however, this would have to be effectuated manually by way of a tool 48, for example a spanner 48 corresponding to the adjusting screw 42, in a manual manner.

In principle, the magnetic element 24 or its mount 28 can be held in position by friction in the seat of the magnetic element 24 or of the mount 28 encompassed thereby and/or by friction in the positioning drive, for example the above-described screw drive. In an embodiment that is advantageous as it is more reliable, the magnetic element 24 or the mount 28 encompassed thereby comprises, for example in a foot region, fastening means 39, 41, 46, by way of which the magnetic element 24 or its mount 28 can be fixed to the magnetic element carrier 29 or cylinder 26 and, for the purpose of axial alignment or adjustment, can be detached at least to such an extent that the magnetic element 24 can be axially moved at least within the adjustment range.

In a preferred embodiment, a clamping connection 39, 41, 46 can be provided between the respective magnetic element 24 and the cylinder body 29 serving as the fastening means 39, 41, 46 for the magnetic elements 24, wherein a vertically movable clamping element 41, for example a clamping block 41, is provided, for example at the magnetic element 24, which can be tightened by a clamping drive 39, for example a screw 39, from beneath, i.e., from the cylinder interior, in particular on both sides, against a brace 46, for example support rib 46, that is fixed to the cylinder body, and in particular is fixed to the carrier element. The mount 28 and the clamping element 41 can be tightened against one another by a screw that protrudes through the bottom of the mount 28 in the interior of the magnetic element 24 and cooperates with a thread in the clamping element 41, or, as is shown here, by a wedge drive including, for example, a screw 39, which with a wedge-shaped or trapezoidal tip engages in a groove or an aperture 49 of a web 47, which carries the clamping element 41 and in particular extends radially, in the manner of a wedge drive. The groove or an aperture 49 and the screw 39 are arranged with respect to one another in such a way that the web 47, and thus the clamping element 41, is tightened toward the mount 28, and clamping between the clamping element 41 and the support rib 46 is effectuated when the screw 39 is pushed further by way of a corresponding thread through the mount 28 and displaced into the groove or into the aperture 49. When the screw 39 is unscrewed, in contrast, the lifting of the clamping element 41 is canceled, and the clamping is relaxed. In this embodiment, clamping is possible without a magnet 27 or a housing 38 accommodating a magnet 27 having to be removed from the mount 28. The clamping can preferably likewise be effectuated by way of a tool, preferably by way of the same tool 48, as the axial adjustment.

A distance between the support ribs 46 on both sides of the web 47 in the axial direction of the cylinder 26 is dimensioned in such a way that the web 47 or an aforementioned screw extending through the bottom of the mount 28, as viewed in a center position, has a play that at least corresponds to the adjustment range toward both axial directions.

In a particularly advantageous refinement, the above-described support ribs 46 and the interruption therebetween in the circumferential direction extend over a length that allows at least one of the magnetic elements 24 of a relevant group to be displaced in the circumferential direction over at least a circumferential section of more than 10 mm, preferably more than 50 mm, particularly preferably continuously over at least half the cylinder circumference.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A device for aligning magnetic or magnetizable particles (P) contained in a coating agent (06), comprising a cylinder (26), which comprises a number of n×m (in words: n times m, where n, m 0 ]) elements (24) providing magnetic fields, magnetic elements (24) for short, in the region of its outer circumference in a matrix-like manner, which are arranged one behind the other in m columns extending in the circumferential direction of the cylinder (26) and next to one another in n rows extending in an axially parallel manner, in several of the columns of magnetic elements (24) arranged one behind the other in the circumferential direction in each case the magnetic elements (24) of these columns being mounted as a group at or on a shared carrier element (31) and being variable with respect to their axial position in or at the cylinder (26) by way of the carrier element (31), collectively as a group and independently of the magnetic elements (24) of an adjoining column, and, in these columns, in each case at least one of the magnetic elements (24) being arranged and/or mounted on the carrier element (31) of a multi-piece cylinder body (29) of the cylinder (26) so as to be adjustable in the axial direction, by way of mechanical adjusting means (42, 43, 44) comprising a gearbox, independently of at least one further magnetic element (24) of the same column which is mounted on the same carrier element (31).

2. The device according to claim 1, characterized in that the magnetic elements (24) can be positioned at the relevant carrier element (31) in the circumferential direction and/or can be completely removed from the cylinder (26).

3. The device according to claim 1, characterized in that, in all columns, the magnetic elements (24) of the column are arranged as a group at the same carrier element (31) and can be axially adjusted independently in each case of multiple or all other magnetic elements (24) of the same group.

4. The device according to claim 1, characterized in that the carrier elements (31) are arranged on a shaft encompassed by the cylinder (26).

5. The device according to claim 1 characterized in that the carrier elements (31) of all or at least of the two groups of magnetic elements (24) of at least three groups that are closest to the end face are mounted so as to be axially adjustable in or at the cylinder (26) and/or on a shaft encompassed by the cylinder (26), independently of the other carrier elements (31).

6. The device according to claim 1, characterized in that the adjusting means (42, 43, 44) comprise a gearbox converting a rotational movement into a linear movement and/or a screw drive.

7. The device according to claim 6, characterized in that a stop means limiting the axial movement of the magnetic element (24) is provided, whose stop surface limiting the axial position can be varied by way of the screw drive.

8. The device according to claim 7, characterized in that the stop means is formed by one end of a threaded shaft or of an attachment continuing the same, the threaded shaft engaging in an internal thread provided at the magnetic element (24) or at a mount (28) encompassed thereby, and the end of the threaded shaft (42) or of the attachment being supported in the axial direction against a portion of the cylinder body (29) which is fixed to the cylinder.

9. The device according to claim 8, characterized in that the stop means is formed by a screw head of an adjusting screw (42) encompassing the threaded shaft.

10. The device according to claim 8, characterized in that the magnetic element (24) is preloaded by an axially acting force in the direction of the bearing surface of the stop means by way of a means (44) that applies a force to the magnetic element (24).

11. The device according to claim 1 characterized in that the magnetic element (24) or a mount (28) encompassed thereby comprises fastening means (39, 41, 46), by way of which the magnetic element (24) or its mount (28) can be fixed to the carrier element (31) and, for the purpose of an axial adjustment of the magnetic element (24), can be detached at least to such an extent that the magnetic element (24) can be axially moved relative to the carrier element (31) at least within an adjustment range.

12. The device according to claim 11, characterized in that a clamping connection (39, 41, 46) is provided between the respective magnetic element (24) and the carrier element (31), serving as the fastening means (39, 41, 46) for the magnetic elements (24), the magnetic element (24) or a mount (28) carrying the same being connected by way of a web (47) extending the radial direction to a vertically movable clamping element (41), which can be tightened by a clamping drive (39) from the cylinder interior on both sides against a brace (46) that is provided on both sides of the web (47) and that is fixed to the cylinder body and/or is fixed to the carrier element.

13. The device according to claim 1, characterized in that the respective axially adjustable magnetic element (24) in or at a mount (28) is arranged detachably on or in the carrier element (31) and, together with the mount (28), can be axially adjusted at the carrier element (31) and/or positioned in the circumferential direction.

14. A machine (01) for generating optically variable image elements (03) on printing substrate sections (02), comprising a printing substrate infeed (13), at least one printing unit (04) comprising at least one printing mechanism (11; 12), by which printing substrate sections (02) guided on a transport path through the machine are printed and/or can be printed at least on a first side with multiple-ups (09) of a number of columns and a number of rows in a matrix-like manner, a product receiving system (22), by which processed printing substrate sections (02) can be combined into bundles, and a device (07) for aligning magnetic or magnetizable particles (P) according to claim 1, which is provided in the transport path of the printing substrate sections (02) between the printing unit (04) and the product receiving system (22).

15. The machine according to claim 14, characterized in that the cylinder (26) comprises a number m of groups including magnetic elements (24) which corresponds the number of columns of multiple-ups (09) and/or a number n of magnetic elements (24) arranged, in each group, one behind the other in the circumferential direction which corresponds to the number of rows of multiple-ups (09) per printing substrate section (02).

* * * * *